United States Patent [19]

London

[11] 4,348,626
[45] Sep. 7, 1982

[54] TWO-SPEED SINGLE PHASE MOTOR WITH CENTRIFUGAL SWITCH

[75] Inventor: Solomon London, Fort Wayne, Ind.

[73] Assignee: General Electric Company, Fort Wayne, Ind.

[21] Appl. No.: 187,757

[22] Filed: Sep. 16, 1980

[51] Int. Cl.³ ............................................. H02P 1/18
[52] U.S. Cl. .................................. 318/772; 318/775; 318/785; 318/795
[58] Field of Search ............... 318/772, 775, 782, 785, 318/793–795, 817

[56] References Cited

U.S. PATENT DOCUMENTS

| | | | |
|---|---|---|---|
| 1,712,065 | 5/1929 | Baker | 318/775 |
| 1,944,090 | 1/1934 | Lukens | 318/795 |
| 2,028,230 | 1/1936 | Lyden | 318/795 |
| 2,464,253 | 3/1949 | Morrill | 318/772 |
| 2,689,933 | 9/1954 | Veinott | 318/782 |

*Primary Examiner*—Gene Z. Rubinson
*Attorney, Agent, or Firm*—Joseph E. Papin

[57] ABSTRACT

A two-speed single phase motor of the capacitor-start type is disclosed wherein the motor is switched from the start condition to the run condition by means of a single contact centrifugally actuated switch. The motor comprises high speed and low speed main windings and high speed and low speed start windings wound on the stator core and a double throw selector switch for connecting the high speed main and start windings to the terminal or the low speed main and start windings to the terminals when the motor is operated in the high speed and low speed configurations, respectively. A single pole single throw centrifugally actuated switch connected to the rotor has a single contact pair connected in series with the start capacitor and one of the terminals, and the switch contacts open when the rotor exceeds a predetermined rotational speed to disconnect the start capacitor from the circuit. The same centrifugal switch contact pair is used in both the high speed and low speed configurations. A run capacitor may be connected in series with the high speed start winding in accordance with one embodiment of the invention. In an alternative embodiment, the run capacitor may be connected in series with both the high speed and low speed start windings so that the motor operates as a capacitor-start capacitor-run motor in both the high speed and low speed configurations.

18 Claims, 2 Drawing Figures

TWO-SPEED SINGLE PHASE MOTOR WITH CENTRIFUGAL SWITCH

BACKGROUND OF THE INVENTION

The present invention relates generally to single phase electric motors, and in particular to multiple speed capacitor start motors which are switched from the start condition to the run condition by means of a centrifugal switch.

The typical single phase capacitor start motor has a main and auxiliary or start winding wherein the start winding is spatially displaced from the main winding, usually by an angle of ninety electrical degrees. The start winding is connected in series with a start capacitor, which is generally utilized only during starting conditions of the motor. In order to develop starting torque, it is necessary that the currents and the main and start windings be displaced in time phase, and the capacitor, which causes the start phase current to lead the main phase voltage, is utilized for this purpose.

In order to achieve favorable torque characteristics and to prevent damage to the capacitor at full operating speeds of the motor, it is necessary to switch the start capacitor out of the circuit when the rotor has exceeded a predetermined speed. The most widely used device for switching the start capacitor out of the circuit in fractional horsepower motors is the centrifugal switch. This switch comprises a centrifugal device generally mounted on the rotor shaft, and as the rotor increases in rotational speed, centrifugal force actuates a mechanism which causes a collar to move in the axial direction. The collar engages a switch operating arm carrying one or more contacts, and when the arm is moved axially, the contact pairs are opened. This disconnects the start capacitor from the circuit thereby enabling the motor to run at operating speed with its maximum torque and without damage to the capacitor. If desired, the centrifugal switch may also disconnect the start winding from the circuit. Centrifugal switches of the above and other types are available from a wide variety of manufacturers, such as the General Electric Company, Fort Wayne, Ind.

In order to enable the motor to operate at two speeds, it may be provided with two main windings and two auxiliary or start windings, one of each for each speed. In pole-changing motors, the low speed main winding would have a larger pole configuration than the high speed winding, for example, a four-pole winding for a low speed and a two-pole winding for high speed. The start windings would have the same respective pole configurations. Typically, the centrifugal switch for a two-speed motor of this type would have a plurality of contact pairs if the same switch is to be used in both the high speed and low speed configurations.

Two-speed capacitor start motors have been used in a wide variety of applications, such as fan and pump drives. One particular application of such motors which has proved troublesome is in swimming pool filter pumps. Generally, it is believed to be desirable to run these pumps at two speeds, high speed operation being used when activity in the pool is the greatest and more water per unit time is to be filtered, and low speed when the pool is empty and not as much water circulation is necessary.

One of the problems with this type of installation is believed to be that the motor and pump are normally installed in or above the pool deck so that the motor is exposed to the environment. In sandy environments, such as around pools that are located at or near beach areas, blowing sand is believed to be often become lodged between the contacts of the centrifugal switch thereby preventing closure of the contacts during starting of the motor. Because a centrifugal switch is actuated by a mechanical linkage connected between it and the rotor, it is believed to be very difficult to shield the switch from the environment. Although a running seal obtained by providing baffles separating the switch compartment from the rest of the motor has been utilized in the past, it is believed that this has not proven entirely satisfactory and is expensive to manufacture and assemble.

A technique which has been used to protect a single contact pair of a centrifugal switch is to install a rubber boot around it. Although this is satisfactory in motors where the centrifugal switch merely opens a single contact pair, it is believed to be not feasible in the case of two-speed motors of the type in question wherein three contact pairs are spatially separated on the Y-shaped switch operating arm. It is believed that fabricating a boot which would protect all three contact pairs would be expensive to manufacture and difficult to assemble on the motor during manufacturing thereof. The problem to be overcome, then, is to design a two-speed motor which utilizes a single start capacitor and a single centrifugal switch having only one contact pair in both the high speed and low speed configurations. This will enable the use of a single rubber boot enveloping the centrifugal switch single contact pair thereby protecting the same from blowing sand, insects, rain, and other adverse environmental conditions. Additionally, it is desirable that the motor so designed to accommodate a single pole single throw centrifugal switch has the desired range of speed control and is efficient both in operation and from a manufacturing standpoint.

It is, therefore, an object of the present invention to provide a multiple speed single phase motor of the capacitor start variety that utilizes a single centrifugal switch having a common single pole single throw contact pair for both high speed and low speed operation, thereby facilitating booting of the contacts.

It is a further object of the present invention to provide a single phase multiple speed motor of the capacitor start type wherein the speed of the motor can be accurately selected and controlled.

A still further object of the present invention is to provide a single phase multiple speed induction motor of the capacitor start variety wherein the available separation between the low and high speeds is great, and wherein a variety of motors having different speed ratios can be manufactured with the same basic design by varying only the pole configurations.

Another object of the present invention is to provide a single phase multiple speed motor of the capacitor start variety wherein there is an efficient utilization of copper in the main and start windings and wherein the motor will operate efficiently.

Yet another object of the present invention is to provide a capacitor start single phase motor capable of running at at least two different speeds by switching in main and start windings of varying pole configuration.

SUMMARY OF THE INVENTION

The aforementioned problem of sand, insects and other foreign matter becoming lodged between the contacts of the centrifugal switch is overcome by the present invention wherein switching out of the start capacitor is achieved by a single pole single throw centrifugal switch, which has contacts that can easily be protected by enveloping them in a rubber boot. The motor is changed from the low speed configuration to the high speed configuration by switching out the higher pole main and start windings, while at the same time switching in the lower pole main and start windings by means of a double throw selector switch. The same centrifugal switch contact pair is utilized for both the high speed and low speed configurations, and only a single contact pair is needed to switch out the start capacitor.

The use of different main and start windings having a higher number of poles and a lower number of poles for low speed and high speed operation, respectively, results in the motor having a wider variation between the high and low speeds, and permits more accurate control of the speed. Additionally, the motor is efficient in operation and there is an efficient utilization of copper in forming the windings.

In the case of larger horsepower motors, it is desirable to utilize a run capacitor at least in the high speed configuration, and perhaps also in the low speed configuration. In accordance with the present invention, a run capacitor can easily be added wherein the same run capacitor is utilized in both the high speed and low speed configurations. In another embodiment, the run capacitor is connected in the circuit only in the high speed configuration, and is dropped out when the low speed main and start windings are switched in.

In general, the present invention in one form thereof contemplates a multiple speed capacitor start induction motor comprising a stator core, a rotor rotatable within the stator core, first and second main windings wound on the stator core, first and second start windings wound on the stator core, a start capacitor, and a pair of external terminals connected to a source of excitation voltage. A double throw selector switch having a high speed position and an alternative low speed position connects the first main winding in parallel across the terminals, the first start winding in parallel across the terminals and the start capacitor in series with the first start winding while at the same time disconnecting the second main winding and the second start winding from across the terminals when the selector switch is in its high speed position. When in its low speed position, the switch connects the second main winding in parallel across the terminals, the second start winding in parallel across the terminals and the capacitor in series with the start winding, while at the same time disconnecting the first main and start windings from across the terminals. A single pole single throw centrifugally actuated switch connected to the rotor has a single contact pair connected in series with the start capacitor and one of the terminals, and this switch electrically disconnects the start capacitor from the terminal when the rotor exceeds a predetermined rotational speed.

In accordance with an alternative embodiment of the invention in one form thereof, a multiple speed capacitor start induction motor is provided which comprises a stator core, a rotor rotatable within the stator core, first and second main windings wound on the stator core, first and second start windings wound on the stator core, a start capacitor, and a pair of terminals connectible to a source of excitation voltage. A double throw selector switch having a high speed position and an alternative low speed position connects the first main winding in parallel across the terminals, the first start winding across the terminals and a start capacitor in series with the first start winding while at the same time disconnecting the second main and start windings from across the terminals, when in its high speed position. When the selector switch is in its low speed position, it connects the second main winding in parallel across the terminals, the second start winding across the terminals and the start capacitor in series with the second start winding while at the same time disconnecting the first main and start windings from across the terminals. A centrifugally actuated switch connected to the rotor has a single contact pair connected in series with the capacitor and with one of the terminals and functions to electrically disconnect the start capacitor from the terminal when the rotor exceeds a predetermined rotational speed. The centrifugal switch contacts are connected in series with one of the start windings and said one terminal when the selector switch means is in one of its positions, and the switch means electrically disconnects said one start winding from said one terminal when the rotor exceeds a predetermined rotational speed.

DESCRIPTION OF THE PREFERRED EMBODIMENTS

Figure 1:
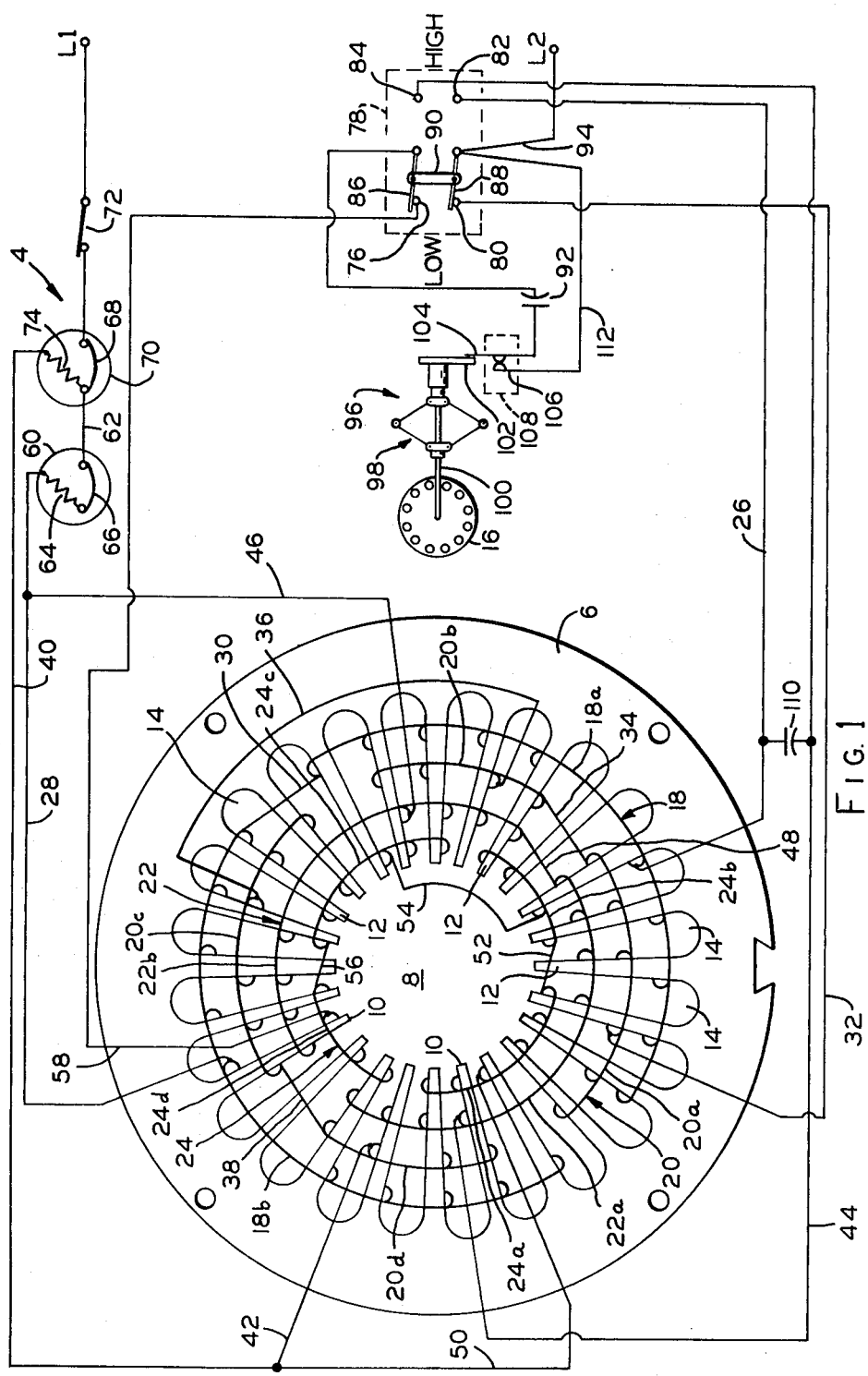
FIG. 1 is a schematic diagram of a motor embodying the present invention in one form thereof connected in the low speed configuration.

Referring now in detail to the drawings, FIG. 1 illustrates a motor 4 according to the present invention in one form thereof comprising a slotted magnetic stator core 6 having a bore 8 extending through the center thereof with the bore 8 being defined by the tips 10 of a plurality of teeth 12. Teeth 12 define therebetween a plurality of slots 14 extending axially through stator core 6. A conventional squirrel cage rotor 16, which is shown in reduced size for clarity, is rotatably received within the bore 8 of stator 6 in a conventional fashion.

Motor 4 comprises main windings 18 and 20 and start windings 22 and 24. High speed main winding 18, which is of a two pole configuration, comprises two symmetrical sets of windings 18a and 18b each comprising five coil groups wound around a plurality of teeth 12 wherein the largest coil in each winding 18a and 18b encircles eleven teeth, the next largest coil nine teeth, the next largest coil seven teeth, the next largest coil five teeth, and the smallest coil three teeth. Winding 18a is connected to lead 26, winding 18b is connected to lead 28, and the windings 18a and 18b are connected together by wire 30.

Low speed main winding 20, which is of a four pole configuration, comprises four windings 20a, 20b, 20c and 20d, wherein windings 20a and 20c each comprise three coil groups, and windings 20b and 20d each comprise two coil groups. The largest coil groups in each of windings 20a and 20c are wound around six teeth 12, the next largest winding is wound around four teeth, and the smallest winding is wound around two teeth 12. The largest coil group in each of windings 20b and 20d is wound around four teeth 12, and the smallest coil group is wound around two teeth 12. Winding 20a is connected to lead 32 and is connected to winding 20b by wire 34, winding 20b is connected to winding 20c by wire 36, winding 20c is connected to winding 20d by wire 38, and winding 20d is connected to lead 40 by wire 42.

High speed start winding 22 comprises two symmetrical windings 22a and 22b each comprising four coil groups. The largest coil group in each winding 22a and 22b is wound around eleven teeth 12, the next largest coil group is wound around nine teeth 12, the next largest coil around seven teeth 12, and the smallest coil around five teeth 12. Winding 22a is connected to lead 44, and winding 22b is connected to lead 46. It will be noted that start winding 22 is electrically displaced 90° around the axis of stator core 6 relative to high speed main winding 18. This, together with the phase displacement of the currents in main winding 18 and start winding 22, causes torque to be exerted on rotor 16 in a manner well known in the electric motor art.

Low speed start winding 24 comprises two symmetric windings 24a and 24c each having three coil groups, and two symmetric windings 24b and 24d each having two coil groups. The largest coil group in each of windings 24a and 24c is wound around six teeth 12, the next largest winding is wound around four teeth 12, and the smallest winding is wound around two teeth 12. The largest coil group in each of windings 24b and 24d is wound around four teeth 12 and the smallest winding is wound around two teeth 12. Low speed start winding 24 is electrically displaced 90° from low speed main winding 20, and the currents are phase displaced so as to exert the necessary rotational torque on rotor 16. Winding 24a is connected to lead 40 by wire 50 and is connected to winding 24b by wire 52, winding 24b is connected to winding 24c by wire 54, winding 24c is connected to winding 24d by wire 56, and winding 24d is connected to lead 58.

Lead 28 from high speed main winding 18 is connected through a conventional thermal line break device 60 to line 62. Line break device 60 comprises a heater 64 and a bimetallic element 66, which opens when the heat generated by overcurrent through heater 64 reaches a given level. Line 62 is connected through the bimetallic element 68 of heater 70 to on/off switch 72, which is connected to power supply line L1. Lead 40 from the low speed main winding 20 is connected through heater 74 and bimetallic element 68 of thermal line break device 70, and through switch 72 to power supply line L1.

Lead 58 from low speed start winding 24 is connected to contact 76 of double pole double throw selector switch 78. Lead 32 from the low speed main winding 20 is connected to contact 80 of selector switch 78. Lead 26 from high speed main winding 18 is connected to contact 82 of selector switch 78, and lead 44 from high speed start winding 22 is connected to contact 84 of switch 78.

Switch 78 comprises a pair of movable contacts 86 and 88 which are interconnected by crossbar 90. Movable contact 86 is connected to start capacitor 92, and movable contact 88 is connected by line 94 to the other power supply terminal L2. Movable contacts 86 and 88 are capable of assuming two operative positions, namely, the low speed position as shown wherein they engage contacts 76 and 80, and the alternative high speed position wherein they would engage contacts 82 and 84. Selector switch 78 may be manually or automatically operated to either of its two alternative positions.

In order to disconnect the start capacitor 92 from the circuit once a predetermined rotational speed of rotor 16 has been obtained, motor 4 is provided with a centrifugal switch 96. Switch 96 is illustrated only schematically and is not intended to portray any specific such device, although a wide variety of centrifugal switches for this type of application are readily available. Switch 96 comprises a centrifugal mechanism 98 which is connected to rotor 16 by shaft 100, and when a predetermined rotational speed of mechanism 98 has been reached, collar 102 will move axially against movable switch contact 104 to break the contact between it and stationary switch contact 106. When this occurs, the series connection between capacitor 92 and lead L2 will be broken. In order to protect contacts 104 and 106 from sand, water, etc., a rubber boot indicated schematically at 108 may be provided.

If desired, a run capacitor 110 may be connected across leads 26 and 44 so that when selector switch 78 is in the high speed position such that movable contact 88 is in engagement with contact 82, capacitor 110 will be connected in series between terminal L2 and high speed start winding 22. Although a run capacitor 110 is desirable for higher horsepower application, it can often be deleted in smaller motors.

The motor of FIG. 1 operates in the following manner. With selector switch 78 is the low speed position illustrated, high speed main winding 18 and high speed start winding 22 are electrically disconnected from the circuit because movable contacts 86 and 88 of switch 78 are out of engagement with stationary contacts 82 and 84. This also removes run capacitor 110 from the circuit. With on/off switch 72 closed, voltage is applied to low speed main winding 20 through line break device 70, lead 40, wire 42 and lead 32. At this time, contacts 104 and 106 are closed, but as rotor 16 comes up to speed, centrifugal mechanism 98 causes collar 102 to press against movable contact 104 thereby disengaging it from stationary contact 106. This disconnects start capacitor 92 from the circuit, and also disconnects low speed start winding 24. At this time, the motor 4 is in the run condition and current passes only through low speed main winding 20.

With switch 78 in the high speed position wherein movable contacts 86 and 88 are in engagement with contacts 84 and 82, respectively, low speed main winding 20 and low speed start winding 24 are disconnected from the circuit. High speed main winding 18 is connected to terminal L2 through lead 26, switch contact 88 and wire 94. High speed start winding 22 is connected through lead 44, terminal 84, movable switch contact 86, capacitor 92, centrifugal switch contacts 104 and 106, wire 112 and wire 94 to power supply terminal L2. Run capacitor 110 is connected to terminal L2 through lead 26, movable switch contact 88 and wire 94. As rotor 16 comes up to speed, contacts 104 and 106 of centrifugal switch 96 will be broken thereby disconnecting start capacitor 92 from the circuit. Due to the presence of run capacitor 110, however, high speed start winding 22 will remain connected in the circuit.

Figure 2:
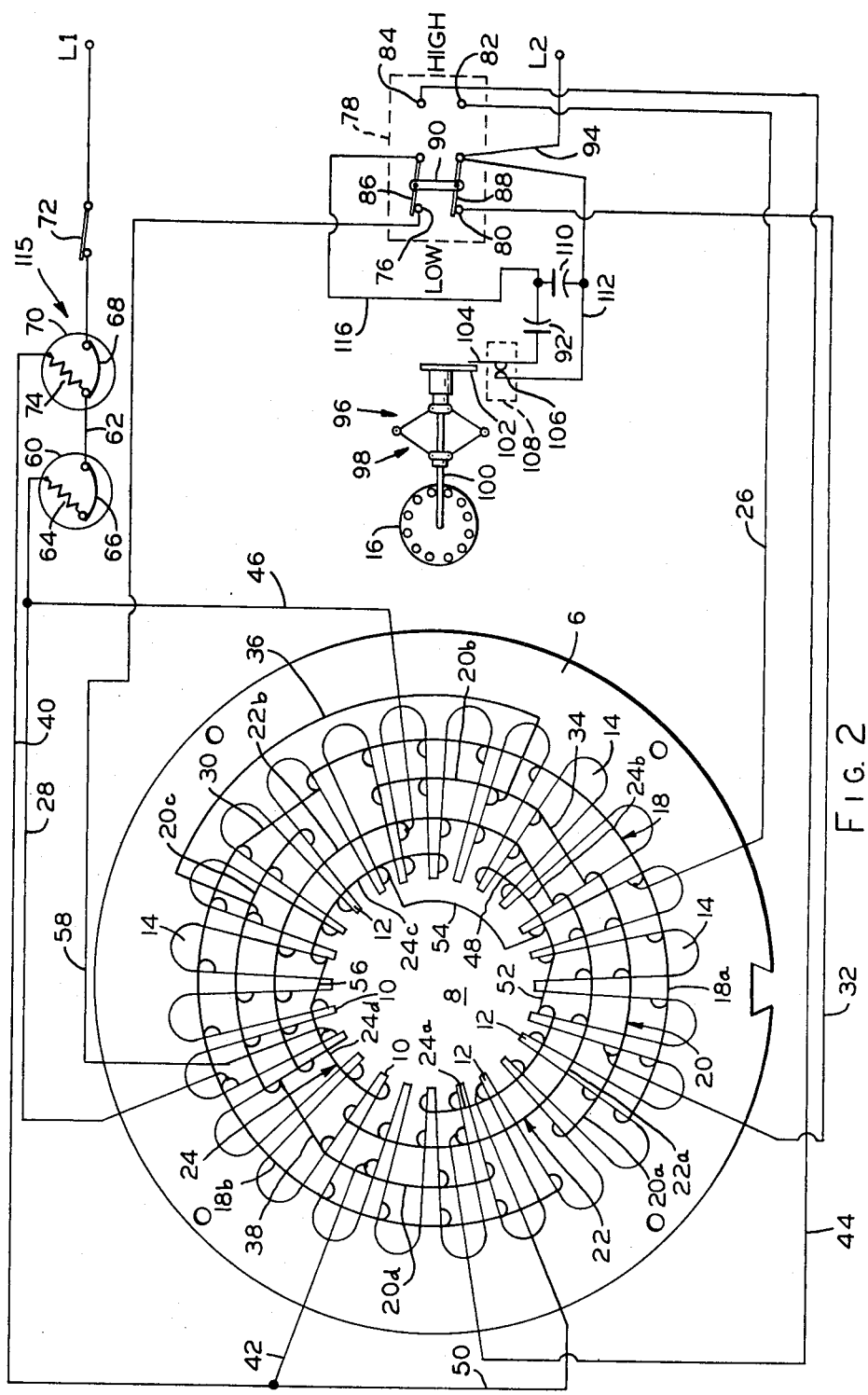
FIG. 2 is a schematic diagram of an alternative embodiment of the motor according to the present invention in one form thereof connected in the low speed configuration.

Motor 115 shown in FIG. 2 is identical to that shown in FIG. 1 except that the run capacitor 110 is no longer connected between leads 26 and 44, but is connected between wires 112 and 116 in parallel with the series connection of start capacitor 92 and centrifugal switch contacts 104 and 106. switch contacts 104 and 106.

In this configuration, run capacitor 110 remains in series with whichever start winding 22 or 24 that is connected in the circuit by selector switch 78. Furthermore, run capacitor 110 causes high speed start winding 22 and low speed start winding 24 to remain in the circuit even after contacts 104 and 106 have opened as rotor 16 comes up to speed. This configuration is advantageous for higher horsepower motors wherein it is desirable for the run capacitor to remain in the circuit in both the high speed and low speed configurations.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed as new and is desired to be secured by Letters Patent of the United States is:

1. A multiple speed capacitor start induction motor adapted for connection to a source of excitation voltage comprising: a stator core, a rotor rotatable within said stator core, a first main winding wound on said core, a second main winding wound on said core, a first start winding wound on said core, a second start winding wound on said core, a start capacitor, a pair of terminals adapted to be connected to the source of excitation voltage, a double pole double throw selector switch means having first and second switch elements movable between a high speed position and an alternative low speed position for connecting said first main winding in parallel across said terminals and said first start winding in parallel across said terminals and said starting capacitor in series with said first start winding while at the same time disconnecting said second main winding and said second start winding from across said terminals when in its said high speed position and for connecting said second main winding in parallel across said terminals and said second start winding in parallel across said terminals and said start capacitor in series with said second start winding while at the same time disconnecting said first main winding and said first start winding from across said terminals when in its said low speed position, one of said first and second switch elements being connected in series with said start capacitor and the other of said first and second elements being connected with one of said terminals, a single pole single throw centrifugally actuated switch means associated for conjoint rotation with said rotor and having a single contact pair connected in series with said start capacitor and one of said one terminal and the other of said terminals, said centrifugally actuated switch means electrically disconnecting said start capacitor from said one of said one terminal and said other terminal when said rotor exceeds a predetermined rotational speed, and a run capacitor connected in series with at least one of said first and second start windings.

2. The motor of claim 1 including a first overload line break device connected in series with one of said one terminal and the other of said terminals and said first main winding and a second overload line break device connected in series with said one of said one terminal and said other terminal and said second main winding.

3. The motor of claim 1 wherein said run capacitor is in series with said first start winding when said selector switch means is in the high speed position and in series with said second start winding when said selector switch means is in the low speed position.

4. The motor of claim 3 wherein said run capacitor remains connected in series with said first and second start winding when said selector switch means is in the high speed and low speed positions, respectively, regardless of whether said centrifugally actuated switch means is open or closed.

5. The motor of claim 1 wherein said run capacitor is connected in parallel with said centrifugally actuated switch means when said selector switch means is in one of said high speed or low speed positions.

6. The motor of claim 1 wherein said second main winding and said second start winding are each of a larger pole configuration than said first main winding and said second main winding, respectively.

7. The motor of claim 6 wherein said first main winding and said first start winding are of two pole configuration and said second main winding and said second start winding are of four pole configuration.

8. The motor of claim 1 wherein said first main winding and said second main winding remain connected across said terminals when said selector switch means is in the high speed position.

9. A multiple speed capacitor start induction motor adapted to be connected to a source of excitation voltage comprising: a stator, a rotor rotatable within said stator, first and second main windings wound on said core, first and second start windings wound on said core, a pair of terminals adapted to be connected with the source of excitation voltage, a start capacitor, double throw selector switch means having a high speed position and an alternative low speed position for connecting said first main winding in parallel across said terminals and said first start winding across said terminals and said start capacitor in series with said first start winding while at the same time disconnecting said second main winding and said second start winding from across said terminals when in its said high speed position and for connecting said second main winding in parallel across said terminals and said second start winding across said terminals and said capacitor in series with said second start winding while at the same time disconnecting said first main winding and said first start winding from across said terminals when in its said low speed position, and a centrifugally actuated switch means associated for conjoint rotation with said rotor and having a single contact pair connected in series with said capacitor and with one of said terminals, said centrifugally actuated switch means electrically disconnecting said start capacitor from said one terminal when said rotor exceeds a predetermined rotational speed, said centrifugally actuated switch means contacts being connected in series with said second start winding and said one terminal when said selector switch means is in one of said positions, and said centrifugally actuated switch means electrically disconnects said second start winding from said one terminal when said rotor exceeds a predetermined rotational speed with said first start winding remaining connected across said terminals upon the opening of said centrifugally actuated switch means when said selector switch means is in the high speed position.

10. The motor of claim 9 further comprising a run capacitor connected in series with said first start winding and one of said terminals.

11. The motor of claim 10 wherein said run capacitor is connected in parallel with the centrifugally actuated switch means contacts.

12. The motor of claim 11 wherein said run capacitor is connected in parallel with said start capacitor.

13. The motor of claim 9 wherein said second main winding and said second start winding are of a higher pole configuration than said first main winding and said first start winding, respectively.

14. The motor of claim 13 wherein said first main and first start windings are each of two pole configuration and said second main and start windings are each of four pole configuration.

15. A multiple speed capacitor start induction motor adapted to be connected to a source of excitation voltage comprising: a stator, a rotor rotatable within said stator, first and second main windings wound on said core, first and second start windings wound on said core, a pair of terminals adapted to be connected with the source of excitation voltage to a source of excitation voltage, a start capacitor, double throw selector switch means having a high speed position and an alternative low speed position for connecting said first main winding in parallel across said terminals and said first start winding across said terminals and said start capacitor in series with said first start winding while at the same time disconnecting said second main winding and said second start winding from across said terminals when in its said high speed position and for connecting said second main winding in parallel across said terminals and said second start winding across said terminals and said capacitor in series with said second start winding while at the same time disconnecting said first main winding and said first start winding from across said terminals when in its said low speed position, a centrifugally actuated switch means connected to said rotor and having a single contact pair connected in series with said capacitor and with one of said terminals, said centrifugally actuated switch means electrically disconnecting said start capacitor from said one terminal when said rotor exceeds a predetermined rotational speed, said centrifugally actuated switch means contacts being connected in series with one of said first and second start windings and said one terminal when said selector switch means is in one of said positions and said centrifugally actuated switch means electrically disconnects said one of said first and second start winding from said one terminal when said rotor exceeds a predetermined rotational speed, and a run capacitor connected in series with the other of said start windings and one of said terminals.

16. The motor of claim 15 wherein said one of said first and second start windings is the second start winding and said other of said first and second start windings is the first start winding.

17. The motor of claim 16 wherein said run capacitor is connected in parallel with the centrifugally actuated switch means contacts.

18. The motor of claim 17 wherein said run capacitor is connected in parallel with said start capacitor.

* * * * *